(12) United States Patent
Williams et al.

(10) Patent No.: US 7,724,179 B2
(45) Date of Patent: May 25, 2010

(54) MINIATURIZED MICROWAVE-PHOTONIC RECEIVER

(75) Inventors: Brett A. Williams, Iowa City, IA (US); Mark A. Turner, Arlington, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 71 days.

(21) Appl. No.: 12/027,868

(22) Filed: Feb. 7, 2008

(65) Prior Publication Data

US 2009/0051582 A1 Feb. 26, 2009

Related U.S. Application Data

(60) Provisional application No. 60/899,869, filed on Feb. 7, 2007.

(51) Int. Cl.
*G01S 7/02* (2006.01)
*G01S 13/00* (2006.01)
*F41G 7/00* (2006.01)

(52) U.S. Cl. ............ 342/54; 244/3.1; 244/3.15; 244/3.19; 342/61; 342/62; 342/89; 342/175; 342/195; 342/196; 342/368; 342/375; 342/376

(58) Field of Classification Search ........... 244/3.1–3.3; 342/52–55, 82, 89–103, 175, 192–197, 25 R–25 F, 342/33, 118, 120, 157, 159–164, 165, 167, 342/173, 174, 200–204, 368, 375, 376, 61–65, 342/104–115, 128–147; 89/1.11
See application file for complete search history.

(56) References Cited

U.S. PATENT DOCUMENTS

| | | | | |
|---|---|---|---|---|
| 3,991,417 A | * | 11/1976 | Levine | ............... 342/160 |
| 4,087,815 A | * | 5/1978 | Garrison et al. | .............. 342/112 |
| 4,216,474 A | * | 8/1980 | Levine | ............... 342/175 |
| 4,258,363 A | * | 3/1981 | Bodmer et al. | ............... 342/157 |
| 4,329,686 A | * | 5/1982 | Mourou | ................... 342/202 |
| 4,620,193 A | * | 10/1986 | Heeks | ................... 342/200 |
| 4,673,939 A | * | 6/1987 | Forrest | ................... 342/174 |
| 4,806,932 A | * | 2/1989 | Bechtel | ................. 342/33 |
| 4,885,589 A | * | 12/1989 | Edward et al. | ............... 342/175 |
| 4,922,256 A | * | 5/1990 | Brandstetter | ................ 342/132 |

(Continued)

OTHER PUBLICATIONS

Howerton et al., "Low-Biased Fiber-Optic Link for Microwave Downconversion" IEEE Photonics Technology Letters, 1996, vol. 8, No. 12, pp. 1692-1694.

(Continued)

*Primary Examiner*—Bernarr E Gregory
(74) *Attorney, Agent, or Firm*—Buchanan Ingersoll & Rooney PC

(57) ABSTRACT

A receiver, such as a miniaturized microwave-photonic coherent receiver (MMPR) is disclosed. The receiver includes an antenna to output an electrical RF signal received on a section of the antenna, a laser to produce an optical signal, a photonic modulator to receive the optical signal and the electrical RF signal and produce an EO-RF signal and to receive the optical signal and an electrical LO signal and produce an EO-LO signal, a signal combiner to provide a combined EO-RF and EO-LO signal and a photodiode to receive the combined signal and produce an IF signal. A method of detecting an object using the MMPR includes receiving an electrical RF signal corresponding to the object, outputting the electrical RF signal to a photonic modulator, modulating the electrical RF signal onto an optical carrier, demodulating the electrical RF signal to produce an IF signal and processing the IF signal.

19 Claims, 3 Drawing Sheets

U.S. PATENT DOCUMENTS

| | | | | |
|---|---|---|---|---|
| 4,929,956 | A * | 5/1990 | Lee et al. | 342/54 |
| 5,051,754 | A * | 9/1991 | Newberg | 342/375 |
| 5,117,239 | A * | 5/1992 | Riza | 342/375 |
| 5,177,488 | A * | 1/1993 | Wang et al. | 342/167 |
| 5,181,138 | A * | 1/1993 | Davis et al. | 342/100 |
| 5,231,405 | A * | 7/1993 | Riza | 342/375 |
| 5,247,309 | A * | 9/1993 | Reich | 342/368 |
| 5,353,033 | A * | 10/1994 | Newberg et al. | 342/375 |
| 5,359,334 | A | 10/1994 | Gutman | |
| 5,442,360 | A * | 8/1995 | Maignan et al. | 342/120 |
| 5,657,027 | A | 8/1997 | Guymon, II | |
| 5,677,697 | A * | 10/1997 | Lee et al. | 342/368 |
| 5,751,242 | A * | 5/1998 | Goutzoulis et al. | 342/375 |
| 5,848,763 | A | 12/1998 | Mitchell et al. | |
| 5,977,911 | A * | 11/1999 | Green et al. | 342/375 |
| 6,124,827 | A * | 9/2000 | Green et al. | 342/375 |
| 6,125,104 | A | 9/2000 | Shiragaki et al. | |
| 6,262,681 | B1 * | 7/2001 | Persechini | 342/54 |
| 6,362,906 | B1 * | 3/2002 | O'Shea | 342/175 |
| 6,417,804 | B1 * | 7/2002 | Merlet et al. | 342/368 |
| 6,525,682 | B2 | 2/2003 | Yap et al. | |
| 6,574,021 | B1 * | 6/2003 | Green et al. | 342/368 |
| 6,768,458 | B1 * | 7/2004 | Green et al. | 342/375 |
| 6,870,499 | B2 * | 3/2005 | Burns | 342/25 R |
| 6,871,025 | B2 | 3/2005 | Maleki et al. | |
| 7,053,814 | B2 * | 5/2006 | Yap | 342/54 |
| 7,162,156 | B2 | 1/2007 | Frey et al. | |
| 7,382,983 | B2 * | 6/2008 | Mizuma et al. | 342/368 |
| 2003/0090767 | A1 | 5/2003 | Yap et al. | |
| 2004/0001719 | A1 | 1/2004 | Sasaki | |
| 2004/0208590 | A1 | 10/2004 | Nabors et al. | |
| 2004/0239548 | A1 * | 12/2004 | Burns | 342/25 R |
| 2005/0018721 | A1 | 1/2005 | Kish, Jr. et al. | |
| 2005/0156778 | A1 * | 7/2005 | Yap | 342/54 |
| 2005/0238362 | A1 | 10/2005 | Sekiya et al. | |
| 2006/0012519 | A1 * | 1/2006 | Mizuma et al. | 342/368 |

OTHER PUBLICATIONS

Hunter et al., "Wideband Microwave Photonic Channelised Receiver" International Topical Meeting on Microwave Photonics, 2005, pp. 249-252.

Oh et al., "Novel Photonic RF Receiver Using Tunable Brillouin Filtering and Optical Mixing" International Topical Meeting on Microwave Photonics, 2001, pp. 195-197.

International Search Report and Written Opinion from corresponding PCT Application No. PCT/US2008/001599 dated Dec. 3, 2008.

L.A. Johansson et al., "Sampled-grating DBR Laser Integrated with SOA and Tandem Electroabsorption Modulator for Chirp-Control", *Electronics Letters* online No. 20040016 (Oct. 24, 2003) IEE 2004.

"Microphotonic RF Receiver (1999-2004)" Presentation given at USC Aug. 2004; Presentation given at May 2004 CLEO Conference; www.usc.edu/dept/engineering/eleceng/Adv_Network_Tech/html/RFreceiver.html (Nov. 9, 2005) 9 pages.

Thomas A. Germer, "Measurement of Roughness of Two interfaces of a Dielectric Film by Scattering Ellipsometry", *Physical Review Letters* 85(2), 349-352 (2000), pp. 1-8.

Thomas A. Germer et al., "Characterizing Surface Roughness of Thin Films by Polarized Light Scattering", *Advanced Characterization Techniques for Optics, Semiconductors, and Nanotechnologies*, A. Duparre and B. Singh, Eds., Proc. SPIE 5188, 264-275 (2003).

*Williams, Copending U.S. Appl. No. 11/363,240, filed Feb. 28, 2006 entitled "Method and System for Signal Processing by Modulation of an Optical Signal with a Multichannel Radio Frequency Signal".

International Search Report issued Apr. 24, 2008 in International Application No. PCT/US07/05074 corresponding to copending U.S. Appl. No. 11/363,240.

Howerton, M. M. et al., "Subvolt Broadband Litihium Niobate Modulators," http://www.nrl.navy.mil/content.php?P=02REVIEW177.

Copen, D.A. et al. "Microphotonic Components for MM-Wave Receiver," Solid State Electronics, 45 (2001). pp. 495-505

Cohen, David Alan, "Lithium Niobate Microphotonic Modulators," May 2001, PhD Dissertation, pp. i-159.

Ilchenko, V. S., et al, "Sub-Microwatt Photonic Microwave Receiver," IEEE Photonics Technology Letters, vol. 14, No. 11, Nov. 2002, pp. 1602-1604.

"Amplitude Modulation," Image source: http://www.ele.uri.edu/Courses/ele436/labs/expA2.pdf.

Ilchenko, V.S., et al., "Whispering gallery mode electro-optic modulator and photonic microwave receiver," J. Opt. Soc. Am. B, vol. 20, No. 2, Feb. 2003, pp. 333-342.

Balistreri, M.L.M. et al., "Visualizing the whispering gallery modes in a cylindrical optical microcavity," Optics Letters, vol. 24, No. 24, Dec. 15, 1999, pp. 1829-1831.

Mazzei, A. et al, "Optimization of prism coupling to high-Q modes in a microsphere resonator using a near-field probe." Optical Communications, 250 (2005), pp. 428-433.

Hovanessian, "Radar System Design and Analysis", Artech House, 1984, p. 20.

Gorodetsky, M.L., et al, "Optical microsphere resonators: optimal coupling to high-Q whispering-gallery modes," J. Opt. Soc. Am. B, vol. 16, No. 1, Jan. 1999, pp. 147-154.

Laine, J.P., et al, "Microsphere resonator mode characterization by pedestal anti-resonant reflective waveguide coupler," IEEE Photon. Technology Letters, vol. 12, No. 8, Aug. 2000, pp. 1004-1006.

Muga, J.G. et al., "Time dependence of quantum evanescent waves," arXiv: Quantum Physics, vol. 1, Jan. 12, 2000, pp. 1-16.

Castagné, M. et al., "Photon Tunneling From InP Material Surface", LINCS-CEM University Montpellier II, undated, pp. 202-205.

Gifford, A.D. et al., "Comparison of photodiode frequency response measurements to 40 GHz by NPL and NIST," Electronics Letters, vol. 31, No. 5, Mar. 2, 1995, pp. 397-398 http://ts.nist.gov/ts/htdocs/230/233/calibrations/optical-rad/pubs/el31-397.pdf.

Davidson, Andrew et al. "Photodiode-Based Detector Operates at 60GHz", Undated, http://www.newfocus.com/Online_Catalog/Literature/Photodiode.pdf.

Bernard, Jean-Jacques et al., "Semiconductor Optical Amplifiers," OE Magazine, Sep. 2001, pp. 1-8 http://oemagazine.com/fromTheMagazine/sep01/tutorial.html.

Armstrong, I. et al, "Semiconductor optical amplifiers: performance and applications in optical packet switching," Journal of Optical Networking, vol. 3, No. 12, Dec. 2004, Abstract.

Kang, Y. et al, "Fused InGaAs-Si Avalanche Photodiodes With Low Noise Performance", IEEE Technology Photonics Technology Letters, vol. 14, No. 11, Nov. 2002, pp. 1593-1595 http://repositories.cdlib.org/cgi/viewcontent.cgi?article=1868&context=postprints.

Kwon, O.H. et al, "Optimal Excess Noise Reduction in Thin Heterojunction AlGaAs—GaAs Avalanche Photodiodes," IEEE J. Quant. Electron., vol. 39, No. 10, Oct. 2003, pp. 1287-1296.

* cited by examiner

MINIATURIZED MICROWAVE-PHOTONIC RECEIVER

CROSS-REFERENCE TO RELATED APPLICATIONS

This application claims priority from U.S. Provisional Patent Application Ser. No. 60/899,869, filed Feb. 7, 2007, the disclosure of which is hereby incorporated by reference in its entirety.

BACKGROUND

1. Field

The subject matter presented herein relates generally to receivers, and more particularly, to radar receivers employing photonic components.

2. Description of Related Art

Miniature missiles for hit-to-kill defense against mortars and rocket propelled grenades (RPGs) are desired with on-board seekers, achieving end-game accuracy without external target illumination assets. Storage of many rounds for frequent encounters in raid or urban environments and minimizing collateral damage are drivers for smaller hit-to-kill missiles. Size restrictions of miniature missiles are extreme, with 1"-2" diameters making grams and cubic millimeters valuable. However, known systems can suffer from multipath effects in urban/RPG environments (monopulse centroid displacement) and wide noise bandwidth.

SUMMARY

In one embodiment, a receiver includes an antenna configured to output an electrical RF signal received on a section of the antenna, a laser configured to produce an optical signal, a photonic modulator including a first section configured to receive the optical signal and the electrical RF signal and produce an EO-RF signal and a second section configured to receive the optical signal and an electrical LO signal and produce an EO-LO signal, a signal combiner configured to provide a combined EO-RF and EO-LO signal and a photodiode configured to receive the combined signal and produce an IF signal.

In another embodiment, a method of detecting an object includes receiving an electrical RF signal corresponding to the object, outputting the electrical RF signal to a photonic modulator, modulating the electrical RF signal onto an optical carrier in the photonic modulator, demodulating the electrical RF signal to produce an IF signal and processing the IF signal to provide detection data about the object.

BRIEF DESCRIPTION OF THE DRAWINGS

As will be realized, different embodiments are possible, and the details herein are capable of modification in various respects, all without departing from the scope of the claims. Accordingly, the drawings and descriptions are to be regarded as illustrative in nature and not as restrictive.

DETAILED DESCRIPTION

Figure 1:
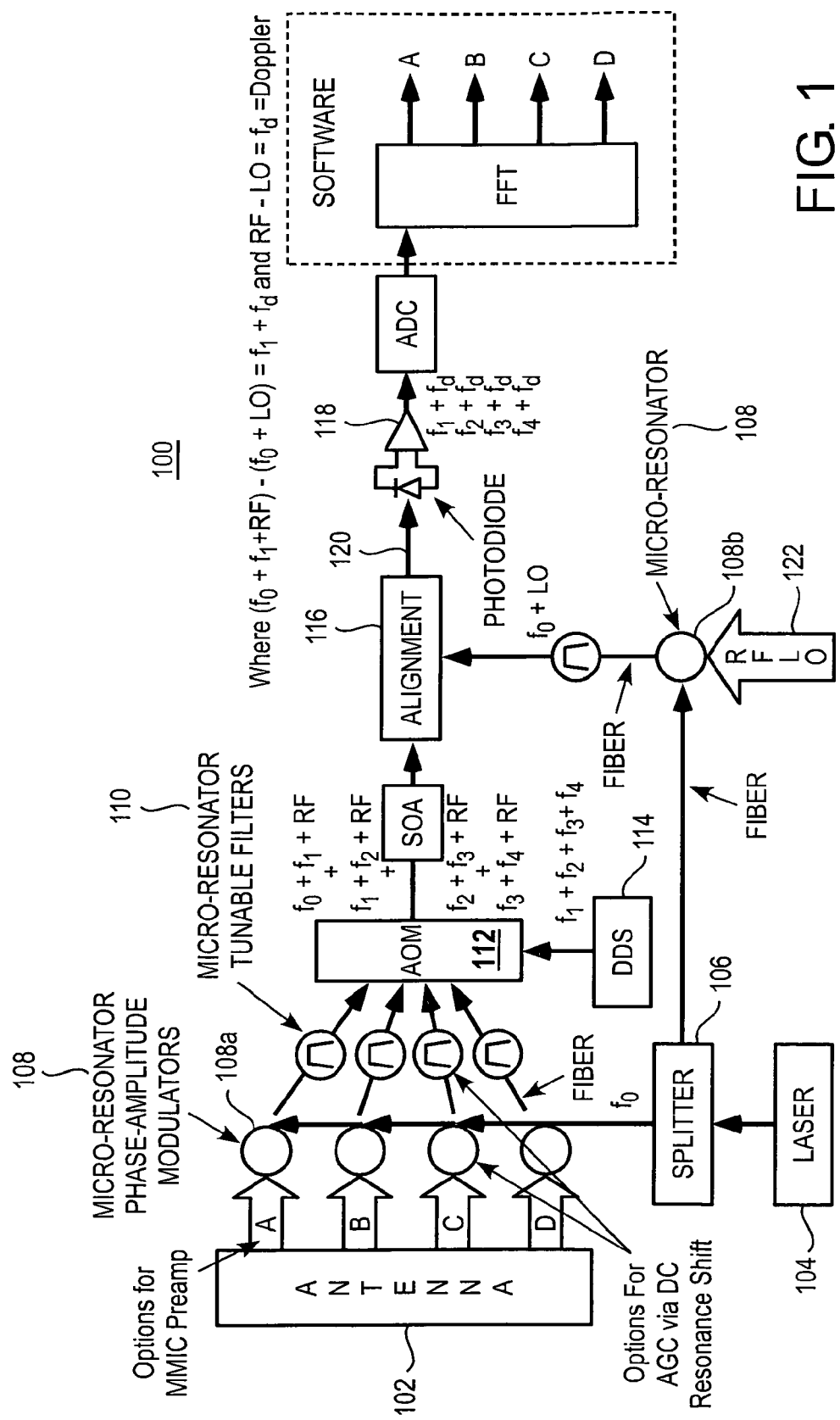
FIG. 1 shows an example of one embodiment of a miniaturized microwave-photonic multichannel coherent receiver in a combined channel superheterodyne configuration.
Figure 2:
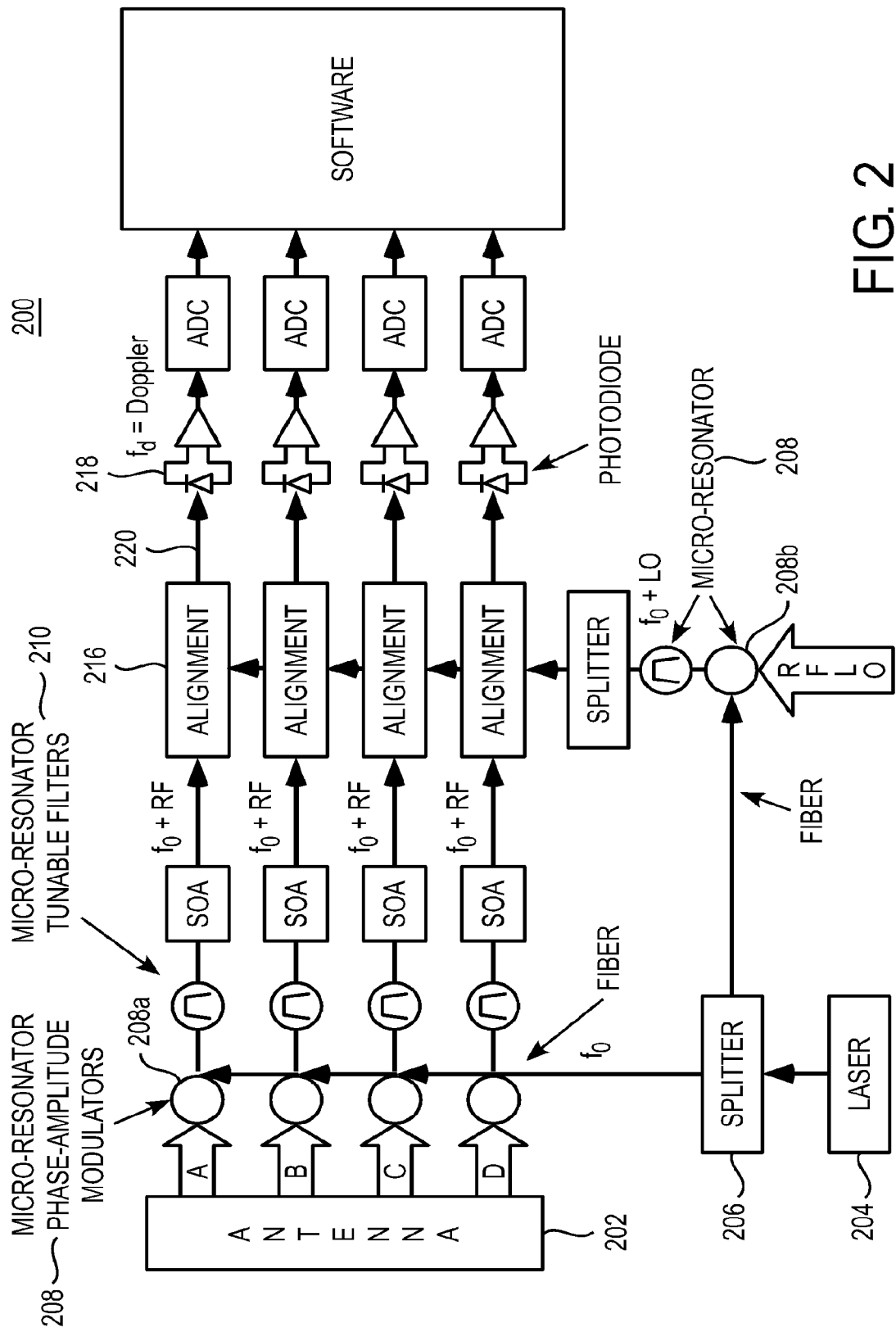
FIG. 2 shows an example of one embodiment of a miniaturized microwave-photonic multichannel coherent receiver in a multi-channel superheterodyne configuration.
Figure 3:
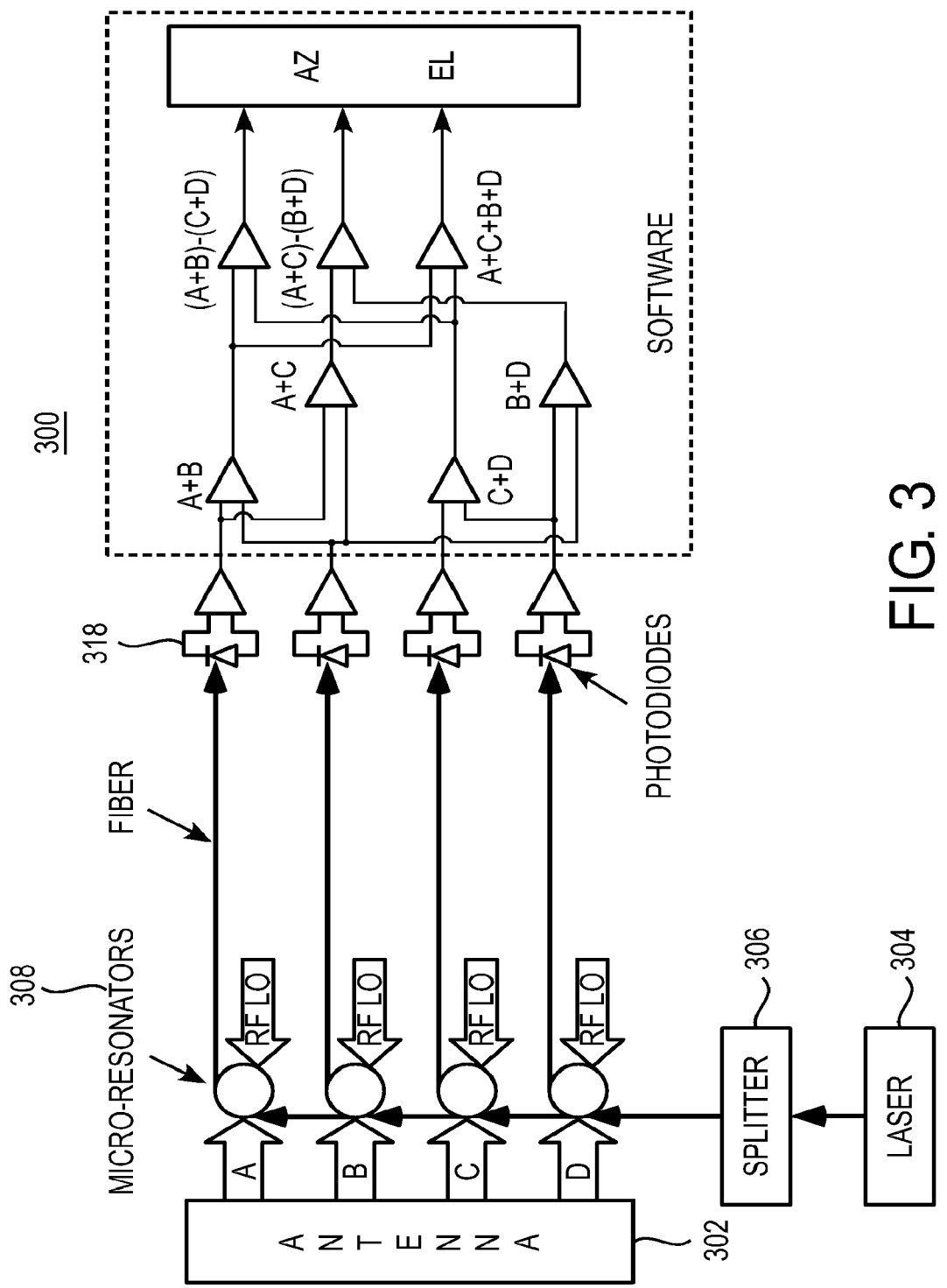
FIG. 3 shows an example of one embodiment of a miniaturized microwave-photonic multichannel coherent receiver in a configuration where RF LO can be applied directly to the microdisk through the self-mixing option within the disk itself.

FIG. 1 shows an example of one embodiment of a receiver, such as a miniaturized microwave-photonic multichannel coherent receiver (MMPR) 100 in a combined channel superheterodyne configuration. FIG. 2 shows an example of one embodiment of an MMPR 200 in a multi-channel superheterodyne configuration. FIG. 3 shows an example of one embodiment of an MMPR 300 in a configuration where RF LO can be applied directly to the microdisk through a self-mixing option within the disk itself. The following description refers to FIG. 1, except to note differences between the embodiments.

The FIG. 1 receiver includes an antenna, such as antenna 102 which can be configured to output an electrical RF signal received on a section of antenna 102. The antenna may be, for example, any 4-quadrant design, slot, electronically steerable array (ESA), patch, etc., with isolation between RF transmit and receive. In one embodiment, the antenna may be a microstrip design.

A laser 104 can be configured to produce an optical signal. In one embodiment, an external cavity diode laser (ECDL) may be used. In another embodiment, a distributed feedback (DFB) laser can be used. In one embodiment, splitter 106 can be used to distribute the optical signal from laser 104 to the photonic modulator 108. In one embodiment, splitter 106 can be a microprism.

In one embodiment, a photonic modulator 108, also known as a microphotonic disk modulator or micro-disk photonic modulator, includes a first section 108a that can be configured to receive the optical signal and the electrical radio frequency (RF) signal and produce an electro-optical-radio frequency (EO-RF) signal and a second section 108b configured to receive the optical signal and an electrical local oscillator (LO) signal and produce an EO-LO signal. In one embodiment, the LO signal may be provided by a master frequency generator and transmitter configured as a local oscillator 122 external to the MMPR. For clarity, photonic modulator 108 is shown having two sections 108a and 108b. In one embodiment, both sections may be part of the same photonic modulator.

In one embodiment, outputs from each quadrant of the RF antenna 102 couple to four micro-disk photonic RF resonators 108a. In one embodiment, this microdisk 108 makes a small receiver possible as it can replace a larger Mach-Zehnder modulator. For example, a known 18 GHz Lithium Niobate (LiNbO3) Mach-Zehnder modulator manufactured by Lucent Technologies is greater than 5 cm long, compared to, for example, a z-cut LiNbO3 disk with gold electrodes that has a radius of 3 mm.

In one embodiment, the micro-disks 108 can be made of LiNbO3 for its high electro-optic coefficients. The disks 108 can carry on top and bottom a metal RF resonant ring structure tuned to the RF frequency of interest, for example, in the analysis treated here, 95 GHz, for its narrow beamwidths and high gain.

In one embodiment, the micro-disk 108 carries internal laser light (1.55 µm) cycling about the inside perimeter of the disk due to total internal-reflection off optically polished walls. This light enters the disk via an input prism through evanescent wave coupling between the prism and disk 108 in which photons tunnel through the low dielectric barrier between them.

One input/output prism connection may be used, or independent input and output prisms may be used. Once the optical signal is established inside the disk 108a, RF waves in the antenna 102 microstrip couple to the micro-disk RF resonator atop the disk. This RF in turn couples to the optical signal through the electro-optic effect—a change in material index with applied RF voltage. An RF electric field between the metal electrodes of the disk interacts with light photons via the electro-optic effect, not a resistive electrical load. Consequently, no damping of the RF Q due to a load resistor occurs for the LiNbO3 disk. The optical signal can be phase modulated by the RF electric field pointing up then down through the LiNbO3, stressing the crystal, periodically changing its index of refraction. Self-mixing within the disk between input optical signal and light already phase modulated results in amplitude modulation of the optical signal with sidebands at the RF above and below the optical carrier (or a Mach-Zehnder configuration can covert PM to AM outside the disk if insufficient self-mixing results). Consequently, an EO-RF signal is produced by disks 108a.

In one embodiment, the EO-RF signal passes through a tunable micro-resonator filter 110 with filter bandwidths as low as 30 MHz (at 200 THz or 0.000015%) strip off the other unwanted RF sideband and the laser carrier, thus reducing risk of photomixer saturation. In the combined channel option (e.g. as in FIG. 1), this filtering also reduces beat products of wavelength division multiplexing (WDM), which is more of a concern for long haul communications than with the centimeter lengths employed here.

In one embodiment, the EO-RF signal passes through a tunable third-order optical filter 110 fabricated from three voltage-controlled lithium niobate whispering gallery-mode resonators can demonstrate 6-dB fiber-to-fiber insertion loss and 30 ns tuning speed. The filter 110 can operate at 1550 nm with 30 MHz bandwidth, electro-optically tuned over as much as 12 GHz in the linear regime with approximately 80 MHz/V tuning rate. Fast 30 ns tuning times can also service transmit frequency hopping practice common in radar as a countermeasure strategy.

In one embodiment, the system could use the upper or lower RF sideband as long as the same-side sideband is maintained throughout the device such that at the final mixing stage the desired difference is achieved, e.g., the difference between lower RF sidebands of received signals and lower sideband of the LO after micro-disk mixing. Or, likewise, the difference between upper RF sidebands of received signals and upper sideband of the LO (The embodiments in FIGS. 1 & 2 are marked with upper sidebands). The difference between, for example, the lower sideband of target inputs and the upper sideband of the LO can be too large for the photomixer passband passing only the minimum difference without needlessly wide passbands and their associated noise. Though photomixers respond to, for example, 200 THz light in this case, they do not pass it, but rather much lower bandwidths—generally in the range of 1-100 MHz, less than a thousandth of the input optical frequency. In one embodiment, 60 GHz photodiodes can be used.

While the four-channel device as shown in FIG. 2 is an acceptable embodiment, the goal of servicing miniature missiles invites a reduction in volume through reduced component size and parts count. To that end, the embodiment shown in FIG. 1 places all four channels of the EO-RF signal on a single fiber after acousto-optic modulator (AOM) 112 frequency staggering imposed by virtue of physical input angle, matched to appropriate multi-frequency input-piezo-drive signals to the AOM 112 (where frequencies are chosen to satisfy the physical input angles). Thus, after heterodyning each independent channel is recovered with an FFT process where each is tagged by a small frequency shift imposed upstream by the AOM 112.

As shown in the embodiment in FIG. 1, filtered EO-RF signals enter the AOM 112. For AOMs driven by an external voltage oscillation (say, from a voltage controlled oscillator or VCO) —which in turn drives an acoustic wave through its medium —that drive frequency also sets the exit angle of light diffracted from the grating effect of its acoustic wave. Hence, reversing this process, input angles that match output angles for a specific frequency will redirect the signal to one fiber collector. Using the AOM 112 with four simultaneous drive EO-RF signals mixed onto one piezo-driveline then allows for four input angles to exit as one if those angles match the frequencies that would have created them.

In one embodiment, the AOM 112 thus behaves like a frequency multiplexer, combining all four EO-RF signal channels onto one line, again, reducing channel, semiconductor optical amplifier (SOA), combiner and photodiode count from four each to one each in the receiver. Though a bulk AOM 112 is implied in FIG. 1, thin-film AOMs are available. In the exemplary embodiment of FIG. 1, the SOA operates on the EO-RF signal output of the AOM. In the exemplary embodiment of FIG. 2, a respective SOA operates on each channel carrying the EO-RF signal.

While FIG. 2 can employ standard four-channel Doppler processing, FIG. 1 shows an AOM 112 creating frequency separations in the various EO-RF signal channels by virtue of each channel's input angle to the AOM. The AOM 112 produces a small frequency shift in these channels without a multiple of sidebands or mixer products. This incident-angle-dependency is known a priori as a tag, designating each channel. By virtue of standard AOM 112 action, all four input beams of the EO-RF signal can be combined into one channel, with the intention of reducing space and volume. Downstream filtering and Fourier processing of combined signals can allow recovery of each channel from which the usual processing takes place after correction for AOM 112 imposed frequency shifts.

In one embodiment, a direct digital synthesizer (DDS) 114 signal can digitally create the same result when it comes to summing the channels in the AOM 112. Instead of four separate VCOs driving the AOM 112, summed in a network, the same combined waveform can be generated by the DDS 114, recreating the waveform from one mechanism instead of four separate devices, possibly resulting in lower volume and cost. A DDS 114 can produce a waveform from a given frequency or a combination. The frequency can depend on two variables: the reference-clock frequency and the binary number programmed into the frequency register (tuning word). The binary number in the frequency register provides the main input to the phase accumulator. If a sine look-up table is used, the phase accumulator computes a phase (angle) address for the look-up table, which outputs the digital value of amplitude—corresponding to the sine of that phase angle—to the DAC (digital analog converter). The DAC, in turn, converts that number to a corresponding value of analog voltage or current. Any waveform can be programmed; in one embodiment four frequencies are needed (or three if one input signal is perpendicular to the AOM 112) on the same waveform. This distorted sine wave would be merely tuning words representing amplitudes over time to the DDS 114.

FIG. 3 shows an example of one embodiment of the MMPR in a configuration where RF LO can be applied directly to the microdisk through the self-mixing option within the disk itself.

In FIG. 3, each microdisk 308 receives a laser signal via microprism, a received RF signal and RF LO signal simultaneously. The two RF signals are by the same delivery method (e.g., an RF transmission line connected to an RF conductor riding on the top of the disk, where the received signal and LO conductor are at different locations on the disk). Both received RF and RF LO simultaneously modulate a laser signal internal to the disk. In this embodiment, the means of generating an RF LO can be, for example, an RF photodiode (e.g., up to 35 GHz passband) immediately at the microdisk, highpass RF filtered, amplified and returned to the microdisk as the RF LO, thus acting as a self generating LO. As shown in FIG. 3, the combined signal is then sent to the photodiodes 318 for heterodyne down conversion and processing.

Both FIGS. 1 and 2 show alignment for channels before the photomixer. This may be accomplished, for example, by a fiber alignment and collocation device 116/216 (assuming sufficient micro-resonator self-mixing) ensuring both the EO-RF signal fiber and EO-LO fiber are properly aligned to its photomixer 118/218 in terms of polarization and direction such that maximum heterodyning efficiency is maintained. Misalignment can result in heterodyne loss. If insufficient micro-resonator self-mixing is present, then the alignment block could also represent a Mach-Zehnder configuration where one phase modulated (PM) arm meets an unmodulated signal from the same phase-consistent source, resulting in amplitude modulation (AM).

Traditional alignment of laser LO and received laser can be done with mirror and percent beam splitters, i.e., a 5% beam splitter passes 95% while reflecting at some angle 5% in another direction, i.e., toward a photodiode/photomixer in order to meet with the received signal. Traditionally, it is upon the photomixer 118/218 where heterodyning takes place (signals are combined) and sum & difference signals are created. Note that the received and LO signals originate from the same source as is common for coherent detection.

Aligning fiber optics is an option when LO and received signal are contained by this type of waveguide (vs. free space as implied above). Polarization maintaining fiber can be used, as matching the two signals' polarizations maximizes heterodyning effects. Freespace transmission can adjust polarization of this component of the two signals. In one embodiment, alignment then means both fibers are located in such a way that signals emitted from each, parallel with each other, overlap and fall on the photomixer surface, preferably with the same E-field polarization. Note that cross-polarization can result in no heterodyning, which also contains information in terms of the polarization returned.

In one embodiment, a signal combiner 120/220 can be configured to provide a combined EO-RF and EO-LO signal. At the combiner, a fiber line carrying the EO-RF signal can meet the EO-LO and its filtered RF-LO sideband. Nonlinear mixing of the EO-RF signal and the EO-LO signal on the photomixer 118/218/318 surface results in the sum and difference of both, in one embodiment, the sum and difference of five signals, including the LO. Since the sums (no matter the combination) are far above the photomixers' capability to pass, the photomixer acts as a filter and only differences remain. Note that each channel will mix with all others, i.e. channel 1 will difference with channels 2, 3 & 4, likewise for the others.

In one embodiment, a photodiode 118/218/318 can be configured as a photomixer to receive the combined signal and produce an IF signal. In one embodiment, photodiodes serve as photomixers upon which the EO-LO (electro-optic local oscillator) and EO-RF can meet, for example, for heterodyne down conversion as input to IF electronics or directly to analog to digital converters (ADCs) for software handling as shown in the Figures. With four channels independently sampled in the digital domain, duties left to RF circuits, such as channel balancing, can be performed in software. In one embodiment, while MMPR employs photodiodes, it may not be sensitive to solar interference as the transmitted/received wavelength external to its photonics receiver is RF.

Frequency shifts imposed by the AOM 112 may be positive or negative depending on input beam direction with respect to the internally traveling acoustic wave. Though all enter from the side, if the top two channels enter top-down against an upward moving acoustic wave then their frequency shift is positive (added Doppler). If on the other hand the bottom two channels are directed from bottom-up along the upward direction of our acoustic wave then frequency shift is negative (subtracted Doppler). (AOMs produce no sidebands as do traditional RF mixers.) This gives the latitude to insert fiber beams with all positive, all negative or a mix to impose desired frequency shifts.

If, for example, each channel were 1 MHz apart from each other but ~10 MHz from the LO, then the outputs of interest will be in the neighborhood of 10 MHz while channel-to-channel differences will be lower in the region of 1-3 MHz (as they mix with each other). An additional difference to account for will be a Doppler frequency shift of the target (at RF frequencies) and any shift that may be imposed in a master frequency generator and transmitter as a baseline offset if desired (for preferential bin placement). For example, for a mach 1 closing velocity between MMPR and a target at 35 GHz RF, this Doppler shift is ~78 kHz, for 95 GHz about 212 kHz. For the specific case of RPGs, closing velocities are expected to be on the order of mach 3 (636 kHz @ 95 GHz RF). Thus the ADCs can want to run at least 4-times faster, ~2.5 MHz for 95 GHz RF with no LO offset. From the standpoint of maintaining pulse shape of a transmitted "square" pulse (which it is not, thus relaxing bandwidth demands) for an assumed 200 kHz PRF at 30% duty, the estimate is about 667 kHz, in the same neighborhood as the Doppler shift.

In one embodiment, to visualize mixing results of the FIG. 1 design, consider Table 1 below assuming a 95 GHz RF transmitter with a 94.99 GHz LO (10 MHz down from transmitter) and an added 200 kHz target Doppler. Note that the AOM offset frequency is that frequency imposed on the laser after passing through the AOM; the input piezo drives would merely be 1 & 2 MHz, thus channels 3 & 4 would enter bottom-up into the AOM. The Channel Deltas column considers only difference products between channel 1 & 2, 3, 4 as other combinations are the same value.

TABLE 1

Frequency Mixing Example

| Channel | AOM Offset | Angle Offset | RF Frequency | Channel Deltas | RF/LO Delta |
|---|---|---|---|---|---|
| 1 | +2 MHz | 0.01° | 95.0022 GHz | 1:1 NA | 12.2 MHz |
| 2 | +1 MHz | 0.005° | 95.0012 GHz | 1:2 = 1.2 MHz | 11.2 MHz |
| 3 | −1 MHz | −0.005° | 94.9992 GHz | 1:3 = 0.8 MHz | 9.2 MHz |
| 4 | −2 MHz | −0.01° | 94.9982 GHz | 1:4 = 1.8 MHz | 8.2 MHz |

The potential for gain control of large signals by DC bias across the micro-resonators is also present. If impedance or other problems arise on the resonators as a result of integrating a DC line, the micro-disk filter may also serve as an attenuator. Attenuation occurs by shifting disk resonance as a measured shift in resonant wavelength due to application of, for example, 8V DC bias between the top and bottom electrodes of the disk. The change in resonant wavelength can be, for example, 0.07 pm/V in one embodiment.

MMPR can use modulation typically found in communications processes, not in radar as applied here. It can be a three-stage procedure:

1) Non-Linear Electro-Optic Effect: phase modulation performed in the microdisk, RF-to-optical (a multiplication)

2) Linear Signal Combination: amplitude modulation, via self-mixing or Mach-Zehnder, optical-to-optical (an addition)

3) Non-Linear Photomixing: performed on the photodiode, optical-to-optical as in EO-RF to EO-LO (a multiplication). Radars apply this process through their RF mixer.

Note also that MMPR can act as a modulator and demodulator in the same package. A single RF tone can be received by the antenna, modulated onto an optical carrier by microdisks, transmitted downstream to filters and photomixers where one sideband is picked off and down-conversion occurs in a demodulation process at the photomixer(s).

Electro-Optic Modulation: Though Mach-Zehnder modulator configurations can be used with the disk arrangement, there is less of a need (assuming sufficient coupling coefficients), thus the employment of the disks in a self-mixing process of phase modulation, converted to amplitude modulation.

The space and time dependence of the optical field as it propagates in the x-direction (horizontal) through a crystal polarized in the z-direction (vertical) for a linear modulator is given by $$E(x,t)=E_z\exp(ik_z x-\omega t)=E_z\exp(i\phi-i\omega t)$$

where $k_z$ is the light wave-number projected in the z-direction, x is distance along x-axis, $\omega$ is light radian frequency, c=speed of light in vacuum and $\phi$ is the optical phase.

$\omega t$ is phase change due simply to progression of the wave through the medium, and would be the same for a lightwave outside the EO-modulation region while still in the material. So, $\phi$ is the phase change through and due to the crystal medium made up of two components—passage through a medium more dense than air and that due to the electro-optic effect. Both factors are shown in parentheses at right in the equation below where the phase adjustment for transverse modulation over a crystal of length l is $$\varphi = k^z l = \frac{\omega}{c} n_z l = \frac{\omega}{c}\left(n_e - \frac{n_e^3}{2} r_{33} E_{0z} l\right) = \frac{\omega}{c}\left(n_e - \frac{n_e^3}{2} r_{33} V \frac{l}{d}\right)$$

and the term $\phi$ denotes phase change due to the medium alone and electro-optic effect, $n_z$ is a composite material index along z-axis, l is modulator length (for micro-disks this is the disk perimeter, $2\pi r$), $E_{0z}$ is the RF field magnitude in the z-direction (up/down), $r_{33}$ is the electro-optic coefficient for LiNbO3 equal to 30.8e-12 m/V, $n_e$ is the material index along the "extraordinary" axis—the z-axis—and equals 2.138 for LiNbO3 at 1.55 µm, $V=E_{0z}d$ is voltage applied to the modulator, and d is modulator thickness. For a sinusoidal RF modulation of frequency $f=\Omega/2\pi$, the modulation voltage can be written as $V(t)=V_{pk}\sin\Omega t$, which has a peak value $V_{pk}$.

With exponents separated, the optical field at the output of a crystal is given by $$E(l,t)=E_z\exp[i\omega n_e l/c]\exp[-i(\omega t+\phi_{pk}\sin\Omega t)]$$

where $\phi_{pk}$ ("pk" for peak) represents the phase change due solely to the electro-optic effect, while the effect due solely to travel through the medium is in the first exponent. Now for disk, $\phi_{pk}$ is then $$\varphi_{pk}=\frac{\omega}{c}\left(\frac{n_e^3}{2}r_{33}V_{pk}\frac{l}{d}\right)R_C d_C = \frac{\pi n_e^3}{\lambda}\left(r_{33}V_{pk}\frac{l}{d}\right)R_C d_C$$

Two terms specific to microdisk resonators, $R_c$ and $d_C$ have been created. $R_C$ is a resonance multiplicative factor accounting for the number of RF cycles in one light trip around the disk in time $\tau_d=n2\pi r/c$, thus $R_C=\tau_d*95$ GHz*2, where we multiplied by 2 to account for the number of up/down E-vector directions in one RF wave cycle. In this example at 95 GHz, $R_C=22$. When resonator and disk are constructed in resonance, this fact amplifies phase modulation. $d_C=26$, is the number of revolutions completed by a photon before exit. Concerned with the electro-optic effect, ignoring the first exponent (as this factor does not create a phase modulation with itself, nor with the outside arm of a Mach-Zehnder since both arms are in the same medium) note that the real part of the equation is by Euler's formula ($e^{ix}=\cos(x)+i\sin(x)$) of the form $$s(t)=A_c\cos[\omega_c t+\phi(t)]$$

where $A_c$ is amplitude of the carrier (the laser) and $$\phi(t)=D_p V_{pk}\sin\Omega t$$

where $$D_p = \frac{\pi n_e^3}{\lambda}\left(r_{33}\frac{l}{d}\right)R_C d_C$$

making $$\phi_{pk}=\beta=D_p V_{pk}$$

We find $\beta$, called the phase modulation index, equivalent to $\phi_{pk}$, known as the phase modulation depth for the z-polarized optical field, where, $\Omega$ is the RF modulation frequency, and $V_{pk}$ is calculated from received target power into a 50 ohm disk-RF-resonator resistance. $D_p$ is a constant of proportionality called the phase sensitivity, in this example of the microdisk, where $D_p=26.5$. Modulation along the z-axis requires about 1/4th the voltage for the same modulation depth as that required for y-axis modulation of the crystal (as crystals have molecular axes defined by Y and Z cuts). An advantage of transverse modulation is that the required voltage can be substantially lowered by reducing the d/l dimension ratio (when solving for $V_{pk}$) and for $\phi_{pk}$ the $V_{pk}/d$ term can be very large for small d as is the case for 200 µm thick micro-disks (e.g. 10 Volts is then 10V/200 µm or 50,000 V/meter).

Amplitude Modulation: Referring to the phase modulation procedure where the phase modulation index $\beta=\pi$ with a maximum phase excursion resulting in 100% modulation, the modulating signal is equal in amplitude to the carrier. The phase-modulated signal is combined with the unmodulated signal to get amplitude modulation.

The phase-modulated signal begins in phase with the unmodulated carrier, then lagging until a maximum value of the modulating RF E-field is reached, at which point the modulated and unmodulated signals are at their maximum phase mismatch. This creates a destructively interfering amplitude minimum when the two are added via Mach-Zehnder or self-mixing of a micro-disk. As the modulating signal declines then reverses E-field direction, the phase modulated signal leads the unmodulated carrier, eventually enough to be again $\pi$ out of phase for destructive interference. For points at which the RF field is zero, both modulated and unmodulated are in phase adding constructively for AM maximums.

The AM signal FFT can have sidebands beyond the first set, moving power out of the detection band that is centered on the first lower or upper peak. For small signals, PM is like AM, while for large modulations PM is like FM in terms of bandwidth. For transmit powers examined here, it rarely approaches $\pi$ modulation depth, in fact rarely higher than about $\phi_{pk}=10°$ at close range. Under these conditions, though vanishingly small sidebands beyond the first will show in the FFT, the first sidebands remain dominant.

Range Detection: In the event the system is unable to acquire satisfactory modulation by reflected power from small targets, there remains an option to amplify incoming signal with RF Monolithic Microwave Integrated Circuits (MMICs) in the microstrip antenna output lines.

In one embodiment, the power actually measured by the receiver uses knowledge of sideband signal strength. Typically, this is a simple matter for AM radio transmitters able to employ whatever modulation index they desire, usually 100%. In the case of AM, power in a sideband is a maximum of 25% of the carrier increasing total output power to 1.5 that of the initial carrier value (when both sidebands are sent, not single-sideband). PM levels are difficult to derive requiring application of Bessel functions.

For AM, the total average signal power (electrical engineering average, not radar average including duty factor, i.e. this is the radar engineering peak power) is allocated between both carrier and sidebands.

$$\langle s^2(t) \rangle = \frac{1}{2} A_C^2 + \frac{1}{2} A_C^2 \langle m^2(t) \rangle = \frac{1}{2} A_C^2 [1 + \langle m^2(t) \rangle]$$

Where $\langle \rangle$ means average, m(t) is the modulation signal, $A_C$ is the carrier peak amplitude (Volts, $V_{pk}$). For the case of 100% AM modulation (which can occur for a PM to AM system at PM $\beta=\pi$), the upper and lower sidebands together carry 50% of the unmodulated carrier power. If the carrier were 5 Watts, then the sidebands would each have 1.25 W, together a total of 2.5 W or 50% of the unmodulated carrier power. For this example $\langle m^2(t) \rangle = \frac{1}{2}$, noticing this modulation signal is equal to the carrier amplitude. Since we measure the first sideband (high or low) while the others are filtered out, in this example, we would measure just 1.25 W after the photomixers.

The modulation index can be set by received power off a target. A numeric method using an FFT can be used to find the sideband level referenced to the carrier. This can be called a "conversion loss." This loss applied to the carrier power, which can be set to 20 mW in code results in measured sideband power after all other losses and gains. This value compared against receiver noise in a 200 Hz Doppler bandwidth yields SNR.

MMPR can have a comparatively narrow band (low noise, high sensitivity) Doppler bin width (200 Hz). Though MMPR also employs photodiodes, they serve as photomixers upon which the EO-LO (electro-optic local oscillator) and EO-RF meet for heterodyne down conversion as input to IF (intermediate frequency) electronics or directly to ADCs for software handling as shown in the Figures, which can employ a Direct-IF, otherwise known as Zero-IF approach.

For various design options, phase matching need not be a concern at optical wavelengths. Longer RF wavelengths can be radiated from the antenna and calibration can be performed at the IF frequency after down-conversion by photomixing. Each calibrated channel phase and amplitude could then be stored in memory for digital correction. IF results from any residual difference between the LO and received signal, including a Doppler shifted return. Doppler is measured as the time derivative of measured phase with reference to the LO where a constant rate of change with respect to the reference is a fixed Doppler frequency. Any offset in transmit vs. LO frequencies would be sufficient to account for laser linewidth in the photonics portion of the receiver as overlap renders the two inseparable.

Note that MMPR could be used for any application desiring small, single channel or multi-channel coherent receivers, such as, for example, satellite-to-satellite communication links, auto collision avoidance, aircraft communications and space probe instrumentation.

Exemplary embodiments can separate RPGs from stationary background clutter. Doppler tracking can be used to separate moving targets from stationary background, alleviating centroid problems in clutter environments of urban RPGs, as well as addressing potential electronic counter-counter measures (ECCM) demands for other threats.

The above description is presented to enable a person skilled in the art to make and use the systems and methods described herein, and is provided in the context of a particular application and its requirements. Various modifications to the embodiments will be readily apparent to those skilled in the art, and the generic principles defined herein may be applied to other embodiments and applications without departing from the spirit and scope of the claims. Thus, there is no intention to be limited to the embodiments shown, but rather to be accorded the widest scope consistent with the principles and features disclosed herein.

What is claimed is:

1. A receiver, comprising:
    an antenna configured to output an electrical RF signal received on a section of the antenna;
    a laser configured to produce an optical signal;
    a photonic modulator comprising a first section configured to receive the optical signal and the electrical RF signal and to produce an EO-RF signal, and a second section configured to receive the optical signal and an electrical LO signal and to produce an EO-LO signal;
    a signal combiner configured to provide a combined EO-RF and EO-LO signal; and
    a photodiode configured to receive the combined signal and produce an IF signal.

2. The receiver of claim 1, comprising:
    a means for splitting the optical signal.

3. The receiver of claim 1, comprising:
    a tunable photonic filter configured to filter the EO-RF signal from the first section of the photonic modulator.

4. The receiver of claim 1, comprising:
    a local oscillator configured to produce the electrical LO signal.

5. The receiver of claim 1, comprising:
    alignment means for aligning the EO-RF signal and the EO-LO signal.

6. The receiver of claim 1, wherein the receiver is a microwave photonic receiver.

7. The receiver of claim 1, wherein the photonic modulator comprises:

a microphotonic disk modulator.

8. The receiver of claim 7, wherein the electrical LO signal is an RF-LO signal, the first section of the photonic modulator comprises a first section of the microphotonic disk, the second section of the photonic modulator comprises a second section of the microphotonic disk, the photonic modulator is configured to provide the RF-LO signal to the microphotonic disk modulator, and the photonic modulator comprises the signal combiner such that the combined EO-RF and EO-LO signal is provided through self-mixing within the microphotonic disk modulator.

9. The receiver of claim 1, wherein the EO-RF signal has a plurality of portions divided over respective channels, and the receiver further comprises:

an acousto-optic modulator configured to receive the EO-RF signal via the channels and combine the portions of the EO-RF signal into one channel.

10. The receiver of claim 9, comprising:

a direct digital synthesizer operatively coupled to the acousto-optic modulator and configured to produce a signal to combine the portions of the EO-RF signal into one channel in the acousto-optic modulator.

11. A method of detecting an object, comprising:

receiving an electrical RF signal corresponding to the object;

outputting the electrical RF signal to a photonic modulator;

modulating, by the photonic modulator, the electrical RF signal onto an optical carrier to produce an optical signal;

demodulating the optical signal to produce an IF signal; and processing the IF signal to provide detection data about the object.

12. The method of claim 11, wherein the modulating comprises:

phase modulation and amplitude modulation.

13. The method of claim 12, wherein the photonic modulator comprises a microphotonic disk modulator, and the step of modulating the electrical RF signal comprises converting, by the microphotonic disk modulator, from phase modulation to amplitude modulation.

14. The method of claim 11, comprising:

filtering the optical signal and one sideband for single sideband detection.

15. The method of claim 11, comprising:

using coherent heterodyne detection of a single AM sideband per channel.

16. The method of claim 15, comprising:

sampling resulting difference signals following the coherent heterodyne detection process.

17. The method of claim 11, comprising:

filtering channel-to-channel mixer products.

18. The method of claim 11, wherein the detection data comprises:

peak power received, angle, Doppler and range.

19. The method of claim 18, comprising:

providing, by a photomixer that detects the peak power received, an indication of the peak power received.

* * * * *